June 26, 1934.  M. H. HOVEY  1,964,355
RELAY
Filed March 5, 1931
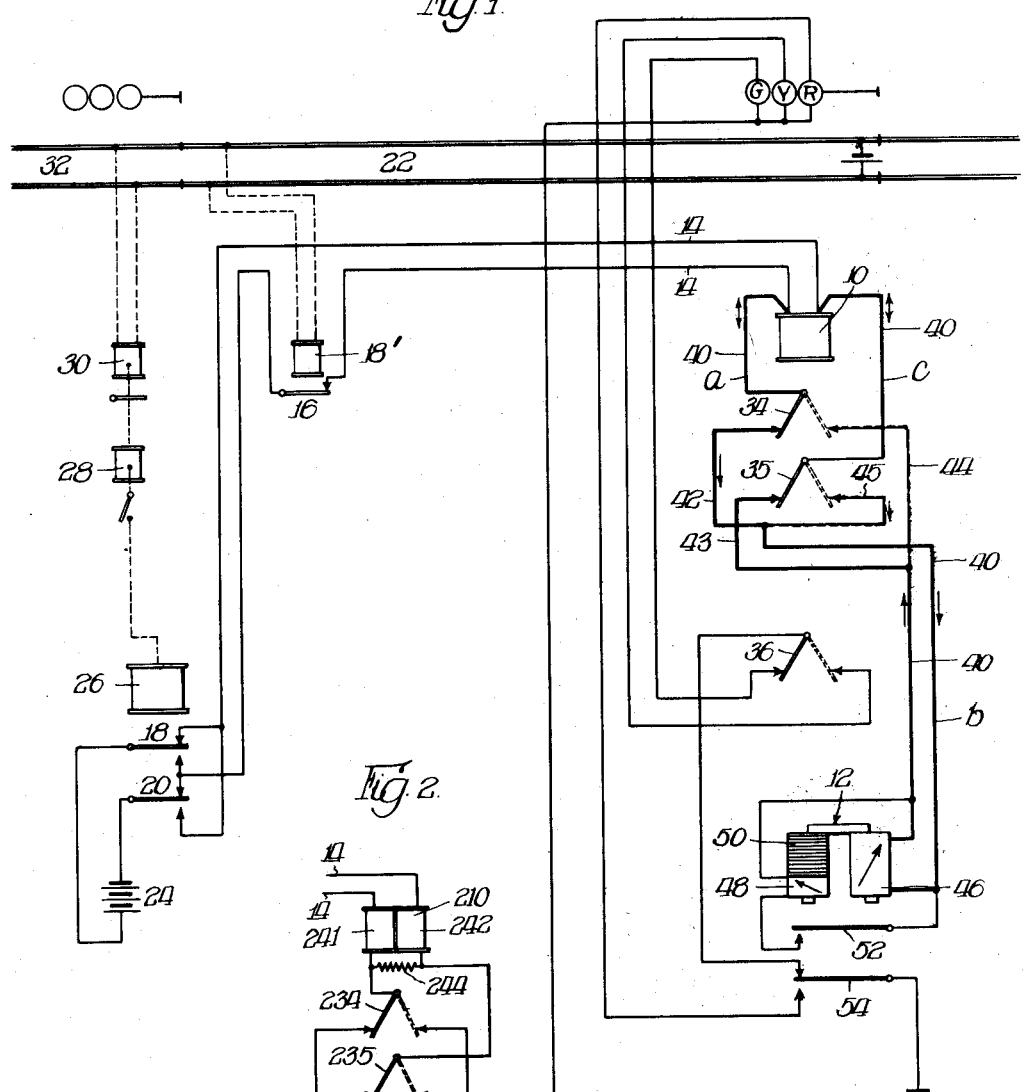
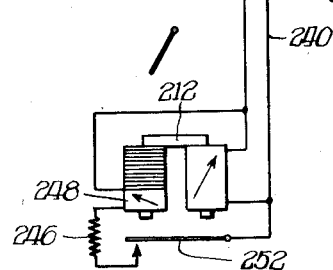
Inventor:
Mark H. Hovey
By Wilkinson, Huxley, Byron & Knight
Attys Patented June 26, 1934

1,964,355

UNITED STATES PATENT OFFICE 1,964,355

RELAY

Mark H. Hovey, Madison, Wis., assignor to The Union Switch & Signal Company, Swissvale, Pa., a corporation of Pennsylvania Application March 5, 1931, Serial No. 520,422

11 Claims. (Cl. 175—320)

This invention relates primarily to railroad signalling, although in its broader aspects it is suitable for use wherever it is desired to have a relay remain constantly energized in spite of the change of polarity of the control current. The invention has been illustrated as used in connection with a signalling system in which a three-indication signal is controlled by a single line circuit, the polarity of current in the circuit determining whether the signal indicates clear or caution. Such a system, including much of the disclosure of this application is disclosed in the inventor's copending application Serial No. 499,886, filed December 4, 1930.

The apparatus illustrated in the accompanying drawing includes a polar relay and a neutral relay, both connected to a single line circuit, the neutral relay being connected through reversible connections controlled by the polar relay with the result that whenever the current in the line is reversed, the polar relay shifts the connections between the line and the neutral relay so that the current flows through the neutral relay in the original and normal direction. As the snapping of the controllers by the polar relay is almost instantaneous, and as the neutral relay preferably is of the slow release type, the neutral relay remains in its energized position throughout the period of change.

A number of objects are accomplished by this invention. Formerly in order to have the relay remain energized during a change in polarity of the line circuit, it was necessary to have an independent local circuit for said relay. The relay thus was a repeater relay and was controlled by a neutral armature of a primary relay in the line circuit. When the circuit was reversed the reversal of the current through the primary relay would de-energize it and release the neutral armature and then have to build up a magnetic field of opposite polarity prior to picking up the neutral armature. The repeater line relay in order to continue in its energized state through this change had to be of a much slower release than is now necessary, as this relay is now controlled by a polar armature which flips almost instantaneously.

Further, the local circuit for the repeater relay is dispensed with and the relay energized by the line circuit, so that there is no chance of the repeater relay being energized when the line circuit is interrupted, even though the local control contacts may stick. Another feature of the invention makes it impossible for the repeater relay to be energized unless current is actually flowing through the coils of the primary line relay, thus avoiding any danger due to a broken coil in the primary line relay.

Still another aspect of the invention provides for a retardation of the pick-up of the repeater relay, so that where, due to the nature of the system, there may occasionally be undesired and erroneous short impulses of current through the line relay, the repeater relay will not be affected by such short impulses.

When used in a signaling system such as what is known as the absolute permissive block system, in which a series of units such as that shown are interconnected, for example as shown in the copending application above referred to, the efficiency of the whole system is greatly increased. As each unit, due to a reduction of its release interval, saves a little time, and as the units are interconnected in such manner that the savings are cumulative, the total time saved is quite material.

With these and various other objects in view, the invention may consist of certain novel features of construction and operation, as will be more fully described and particularly pointed out in the specification, drawing and claims appended hereto.

In the drawing, which illustrates an embodiment of the device, and wherein like reference characters are used to designate like parts, Figure 1 is a diagrammatic illustration of one form of my invention;

Figure 2 is a diagrammatic illustration of a modified form of the invention showing only the units which are modified.

Although my invention may take many forms, only one has been chosen for illustration. The relay set with which this invention is chiefly interested comprises a primary or polar line relay 10 and a repeater or neutral line relay 12. The term repeater relay is used merely as a matter of convenience for it is not what is ordinarily considered a repeater relay, not having a local energizing circuit, and not operating directly in response to operation of the primary relay. Both of these relays are connected to the line circuit 14 which is controlled by various controllers such as 16, 18 and 20. The controller 16 has been shown as operated by a track relay 18' which is energized by a typical track circuit which is shunted whenever the train is on the tracks of track section 22. Controllers 18 and 20, together with their front and back contacts constitute a polarity reversing switch and connect a battery 24 to the line circuit 14 with either polarity, the normal position being shown. The controllers 18 and 20 have been illustrated as being controlled by the relay 26, the control of which has been illustrated very diagrammatically as including a line relay 28 and a track relay 30, which latter would be controlled by track section 32. It should be understood that this might be any type of signalling control, such as that shown for relay 12. When used for single track signalling there would be an additional controller in the line circuit 14, directionally controlled to break the circuit whenever a train is traveling in a direction not controlled by said circuit and its signals.

The relay 10 controls a polar armature which carries circuit controllers 34, 35 and 36. Controllers 34 and 35 constitute a connection reversing switch for reversing the connections between the relay 12 and the line 14. The controller 36 is a selective switch which when supplied with current may direct said current either to the green lamp or the yellow lamp of the signal.

When the line circuit 14 is carrying current in the normal polarity, the controllers 34 and 35 will be in the position shown and will connect the relay 12 to the circuit 14 by the extension circuit 40 including relay connections 42 and 43, shown in heavy lines. The current will then flow through the relay 12 in the normal direction and will energize that relay in a manner to be described. When the relay 26 becomes de-energized the polarity controllers 18 and 20 will shift to their back contacts and reverse the polarity of the current in the circuit 14. This will cause an almost instantaneous flipping of the controllers 34 and 35 to the right hand position shown in dotted lines. The relay 12 will then be reversely connected to the circuit 14 through the circuit 40 now including the relay connections 44 and 45, shown in jagged lines, so that the current will continue to flow through said relay in the original direction.

If we suppose that the wire $a$ of circuit 40 shown to the left of relay 10 would normally carry current in a downward direction, the current would flow downwardly through the connection 42 and downwardly in the wire $b$ of circuit 40, as indicated by the arrow. When the current is reversed to flow upwardly in wire $a$ it would flow downwardly through wire $c$ instead of wire $a$ of circuit 40, downwardly through connection 45 instead of 42 and continue to flow downwardly through wire $b$ as formerly.

Amazing though it may seem, the snap of the controllers 34 and 35 is so nearly instantaneous that a sensitive galvanometer cannot measure any reverse flow of current in the branch circuit 40. This may be in part due to the effect of the relay 12. If the relay 12, or a special coil in parallel with relay 10 were made of sufficiently high inductance and conductance, a break in circuit 14 would leave the coil and the relay in a closed local circuit and result in this high inductance coil sending a reverse current through the relay 10, immediately de-energizing it, and possibly beginning its energization in reverse polarity. Though not necessary in this system, such a construction would be preferred at times, as when a very quick release relay is desired, in which case the armature would be biased to a neutral position. For some purposes the combination of this external release inductance and a neutral relay would be preferred.

The relay 12 includes two coils, namely the pickup or energizing coil 46 and the retardation coil 48. There is also provided means for retarding the release of the relay, such as the copper washers 50 mounted on one of the cores. The retardation coil 48 preferably is not constantly connected to the branch circuit 40, but is connected only when the relay is de-energized and the armature is in its released position. This relay was formerly disclosed in applicant's co-pending application Serial No. 480,081, filed September 6, 1930, entitled Slow acting relay.

When current initially flows through the circuit 14 and through the branch circuit 40, it simultaneously flows through coils 46 and 48. As coil 48 is connected in reverse polarity to coil 46 it retards the effectiveness of the coil 46 and retards the pick-up of the relay. However, the coil 48 is of much smaller conductance-turns than the coil 46 so that when the magnetism of coil 46 has been fully built up it overcomes coil 48 and picks up the armature.

The armature of relay 12 carries the controllers 52 and 54. The controller 52 controls the circuit for the retardation coil so that when the armature is picked up this controller breaks that circuit and the retardation coil 48 ceases to use the line circuit and ceases to oppose the energizing coil 46. This energizing coil 46 then builds up its fullest magnetic field with the result that when the polarity controllers 18 and 20 are shifted causing a momentary interruption of the flow of current in the line circuit 14, the magnetic field in relay 12 is maintained sufficiently strong by the slow release washers 50 to retain the armature in its energized position until the shift of polarity is completed and the current is again flowing through coil 46 in a normal direction.

The controller 54 controls the signal lamp circuits connecting the red lamp through its back contact when the relay 12 is de-energized or when energized connecting the controller 36, and through it, either the green or yellow lamp to the local battery 56.

The apparatus incompletely shown in Figure 2 is substantially the same as that shown in Figure 1 except for the inclusion of two additional features. The relay 212 instead of being connected in parallel with relay 210 is connected in series therewith. In the illustrated form, the relay 212 with its circuit 240 is connected between the two coils 241 and 242 of relay 210. The circuit extends from line circuit 14 through coil 241 through branch circuit 240 including relay 212 back through coil 242 to line circuit 14. In order that the opening of the contacts 234 and 235 may not stop the flow of current in relay 210 a shunt resistance 244 may be inserted in parallel with the relay 212 and its branch circuit as shown.

By thus placing the relay 212 in series with the relay 210 it becomes impossible for the relay 212 to be energized unless current is actually flowing through the relay 210. In the construction shown in Figure 1 it is theoretically possible that a break in the coil of relay 10 would cause that relay to leave the controller 36 in the position shown after reversal of current and that the current would nevertheless energize relay 12. This obviously would cause a production of the clear signal when the caution signal should be given, but with the apparatus of Figure 2 only the danger signal would be given, as relay 212 would not pick up.

Relay 212 is different from relay 12 in that a ballast wire 246 has been inserted in its retardation circuit in series with the retardation coil 248. This ballast wire is made of a material the resistance of which increases with its temperature. The effect of this wire is to give a much wider range of possible retardation than is possible with the retardation coil alone. For example, if it were necessary to retard the pick-up of the relay 212 for a full minute, the retardation coil 248 would have to be almost strong enough to permanently prevent pick-up of the armature by the energizing coil. If such a retardation coil could be made aside from the principle of changing resistance, it would be entirely too delicate for separate operation, for if the current should be materially lowered the energizing coil probably never would develop a sufficient field to pick up the armature.

By inserting in the circuit a ballast wire 246 such long delays are thoroughly safe and practicable. The coils are chosen such that initially coil 248 is relatively quite strong; perhaps strong enough to permanently prevent the pick-up of the relay. As the current flows through the retardation circuit, however, the ballast wire 246 becomes heated by its own resistance and as it becomes heated its resistance increases, so that the current through the retardation circuit decreases. This results in a weakening of the retardation field so that it may be overcome by the energizing coil and cause the pick-up of the relay.

Once the relay has picked up the retardation circuit is broken by controller 252 and the ballast wire 246 immediately begins to cool so that if the relay 212 is subsequently de-energized only momentarily the ballast wire 246 is already in its cooled condition ready to retard the pick-up for the proper time interval.

Many of the advantages of this invention are common to both of the forms illustrated. In neither case can the repeater relay possibly be energized unless current is flowing through the line 14. Both forms permit the use of a line relay without a neutral armature. In a complete signalling system, this, together with the consequent lightening of the remaining structure, represents a very considerable saving, even though it is desirable to equip some of the relays with neutral armatures for special purposes. Likewise, either structure permits the important and cumulative saving of time required for the operation of the signals.

It is to be understood that many other embodiments of the invention including some in improved form, will be apparent, and in the course of time more will be devised by those skilled in the art. It is not desired that this invention be limited to the details described, for its scope includes all such forms or improvements as come within the spirit of the following claims, construed as broadly as the prior art will permit. It might especially be noted that the relay set comprising a polar relay and a neutral relay energized whenever the polar is but unaffected by changes of polarity is of broad utility, in and beyond the signal field, and that the neutral relay may be energized by a local circuit completed through each or either side of the polar armature, which in that case would have a third unoperated position.

What is claimed is:

1. In combination, a first and a second relay connected in series in a circuit, means controlled by the first relay for at times interrupting said circuit between said two relays, and a resistance effective when said circuit is interrupted by said first mentioned means for preventing said first relay from becoming deenergized.

2. In combination, a polar relay and a neutral relay connected in series in a circuit which is reversibly supplied with current, means controlled by the first relay for at times interrupting said circuit between said two relays, and a resistance effective for maintaining a flow of current through said polar relay while said circuit is interrupted between said two relays.

3. In combination, a circuit which is reversibly supplied with current, a resistance, a polar relay connected in series with said resistance in said circuit, and a neutral relay connected in multiple with said resistance over the polar contacts of said polar relay in such manner that said neutral relay will be supplied with current of the same polarity whenever said polar relay is energized in either direction.

4. In combination, a first relay and a second relay connected in series in an energizing circuit, a resistance connected in series with the first relay and in parallel with the second relay in said circuit, and means controlled by the first relay to interrupt the circuit between said resistance and said second relay.

5. In combination, a polar relay and a neutral relay connected in series in an energizing circuit which is reversibly supplied with current, a resistance connected in series with said polar relay and in multiple with said neutral relay in said circuit, and pole changing connections between said resistance and said neutral relay controlled by the polar contacts of said polar relay.

6. In combination, a relatively quick acting polar relay and a relatively slow acting neutral relay connected in series in an energizing circuit which is reversibly supplied with current, connection reversing contacts controlled by said polar relay and interposed in said circuit between said polar and neutral relays, and a resistance connected across said contacts to maintain a flow of current in said polar relay during operation of said connection reversing contacts.

7. In combination, a relatively quick acting polar relay and a relatively slow acting neutral relay connected in series in an energizing circuit which is reversibly supplied with current, connection reversing contacts controlled by the polar armature of said polar relay and interposed in said circuit between said polar and neutral relays, and a resistance connected across said contacts to maintain a flow of current in said polar relay during operation of said connection reversing contacts.

8. In combination, a pair of line wires which are reversibly supplied with current, a polar relay having two coils and provided with a polar armature, a neutral relay provided with an energizing coil and a retardation coil, means for connecting the two coils of said polar relay and the energizing coil of said neutral relays in series across said line wires, said means including a connection reversing switch controlled by the polar armature of said relay and interposed between said energizing coil and the two coils of said polar relay, a shunt resistance connected in series with the coils of said polar relay and in multiple with the energizing coil of said neutral relay between said polar relay and said connection reversing switch to maintain a flow of current in the coils of said polar relay while said connection reversing switch is being operated, a ballast wire made of a material the resistance of which increases with temperature, and means including a back contact of said neutral relay for connecting said retardation coil and said ballast wire in series across said energizing coil when said neutral relay is deenergized, said neutral relay also being provided with means to render it slow releasing.

9. In combination, a pair of line wires which are reversibly connected with a source of current, a relatively quick acting polar relay receiving current from said source over said wires, a slow releasing neutral relay, and means including pole changing contacts on said polar relay for reversibly connecting the two terminals of the energizing winding of said neutral relay with said two wires respectively in such manner that a reversal of current in the winding of said neutral relay is prevented.

10. In combination, a pair of line wires which are reversibly supplied with current, a polar relay connected with said line wires and provided with two controllers which are each moved to a first position or a second position according as said line wires are supplied with current of one polarity or the other, and a neutral relay having one terminal connected directly with one of said line wires over one of said controllers and the other terminal connected directly with the other line wire over the other controller when and only when said controllers occupy their first positions and having said one terminal connected directly with said other line wire over said other controller and said other terminal connected directly with said one line wire over said one terminal when and only when said controllers occupy their second positions.

11. In combination, a pair of line wires which are reversibly supplied with current, a quick acting polar relay connected with said line wires and provided with two controllers which are each moved to a first position or a second position according as said line wires are supplied with current of one polarity or the other, and a slow releasing neutral relay having one terminal connected directly with one of said line wires over one of said controllers and the other terminal connected directly with the other line wire over the other controller when and only when said controllers occupy their first positions and having said one terminal connected directly with said other line wire over said other controller and said other terminal connected directly with said one line wire over said one terminal when and only when said controllers occupy their second positions.

MARK H. HOVEY.